US012652693B2

(12) United States Patent
Vandikas et al.

(10) Patent No.: US 12,652,693 B2
(45) Date of Patent: Jun. 9, 2026

(54) OPTIMIZING USER EXPERIENCE IN ENCRYPTED TRAFFIC

(71) Applicant: Telefonaktiebolaget LM Ericsson (publ), Stockholm (SE)

(72) Inventors: Konstantinos Vandikas, Solna (SE); Alexandros Nikou, Danderyd (SE); Maxim Teslenko, Sollentuna (SE); Lackis Eleftheriadis, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 429 days.

(21) Appl. No.: 18/037,552

(22) PCT Filed: Nov. 18, 2020

(86) PCT No.: PCT/SE2020/051103
§ 371 (c)(1),
(2) Date: May 17, 2023

(87) PCT Pub. No.: WO2022/108496
PCT Pub. Date: May 27, 2022

(65) Prior Publication Data
US 2023/0413315 A1     Dec. 21, 2023

(51) Int. Cl.
*H04W 72/56*     (2023.01)
*H04L 1/00*     (2006.01)

(52) U.S. Cl.
CPC .......... *H04W 72/56* (2023.01); *H04L 1/0026* (2013.01)

(58) Field of Classification Search
None
See application file for complete search history.

(56) References Cited

U.S. PATENT DOCUMENTS

| | | | | |
|---|---|---|---|---|
| 9,979,835 B1* | 5/2018 | Jiang | .................. | H04M 15/885 |
| 10,503,553 B1* | 12/2019 | Ashok | ................ | G06F 11/3024 |

(Continued)

FOREIGN PATENT DOCUMENTS

| | | |
|---|---|---|
| EP | 3 291 479 A1 | 3/2018 |
| EP | 3 737 197 A1 | 11/2020 |
| WO | 2016/048333 A1 | 3/2016 |

OTHER PUBLICATIONS

International Search Report and Written Opinion dated Aug. 12, 2021 issued in International Patent Application No. PCT/SE2020/051103 (8 pages).

(Continued)

*Primary Examiner* — Ayman A Abaza
*Assistant Examiner* — Camquyen Thai
(74) *Attorney, Agent, or Firm* — Rothwell, Figg, Ernst & Manbeck, P.C.

(57)     ABSTRACT

Methods (500) and devices (800) for determining a priority level for a first application or a first application type. The method comprises receiving (s502) a first usage data reporting message, the first usage data reporting message comprising a first masked usage value generated by a first UE (102) using i) a first usage value associated with a first application or a first application type and ii) a mask value. The method further comprises receiving (s504) a second usage data reporting message, the second usage data reporting message comprising a second masked usage value generated by a second UE (104) using i) a second usage value associated with the first application or the first application type and ii) the mask value. The method further comprises combining (s506) the first masked usage value and the second masked usage value, thereby generating a combined usage value; and using (s508) the combined usage (Continued)

value to determine a priority level for the first application or the first application type.

18 Claims, 9 Drawing Sheets

(56) References Cited

U.S. PATENT DOCUMENTS

| | | | |
|---|---|---|---|
| 2007/0081603 A1* | 4/2007 | Jang .................. | H04B 7/15521 |
| | | | 455/13.1 |
| 2013/0166080 A1* | 6/2013 | Furuta .................... | G05B 13/02 |
| | | | 700/286 |
| 2014/0277798 A1 | 9/2014 | Haga et al. | |
| 2019/0206562 A1 | 7/2019 | Shelton, IV et al. | |

OTHER PUBLICATIONS

3GPP TS 23.203 V16.2.0, Dec. 2019, Technical Specification, 3rd Generation Partnership Project; Technical Specification Group Services and System Aspects; Policy and charging control architecture (Release 16) (267 pages).
Andreea B. Alexandru et al., "Private Weighted Sum Aggregation", arxiv.org, Cornell University Library, 201 Olin Library Cornell University Ithaca, NY 14853, arXiv:2010.10640v1 [cs.CR], Oct. 20, 2020 (Oct. 20, 2020) (12 pages).
China Unicom (Rapporteur), "Email discussion summary on solutions for LTE QMC", R2-1708299, 3GPP TSG-RAN WG2 #99, Berlin, Germany, Aug. 21-25, 2017 (17 pages).

* cited by examiner

100
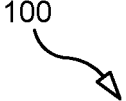
102
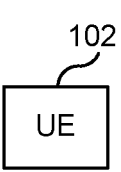
104
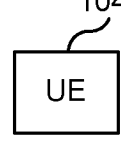
128
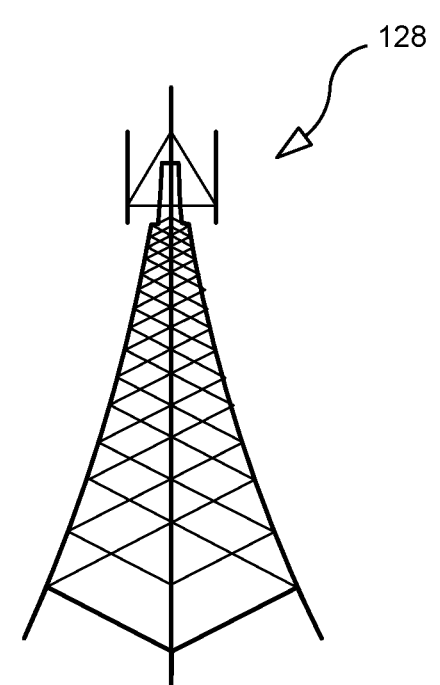
FIG. 1

200
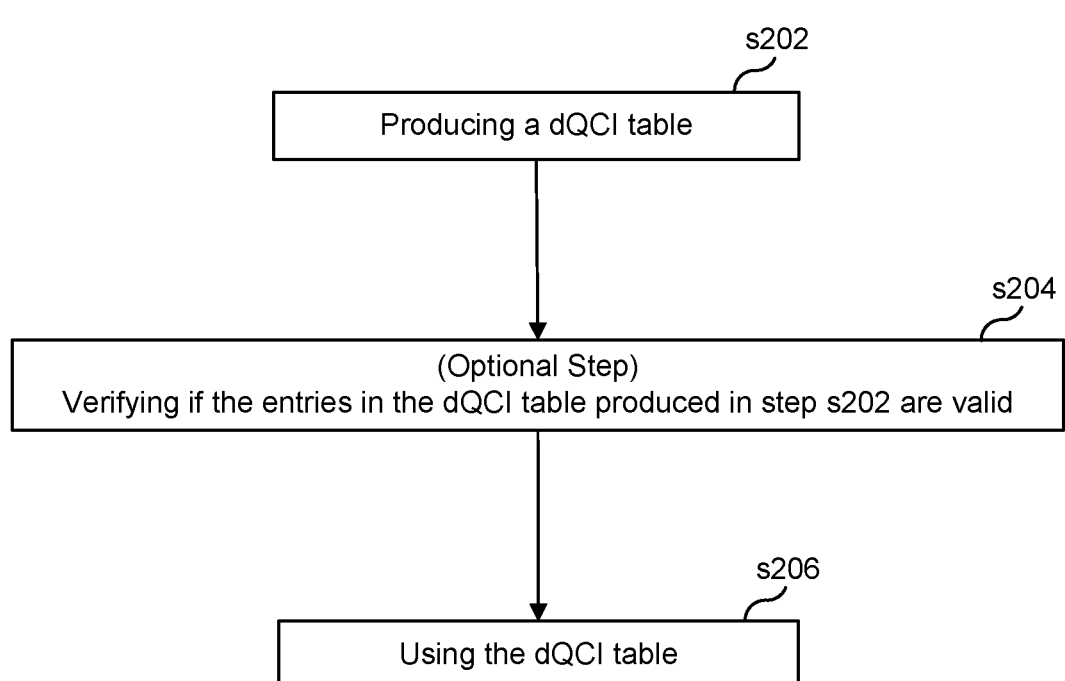
s202
Producing a dQCI table
s204
(Optional Step)
Verifying if the entries in the dQCI table produced in step s202 are valid
s206
Using the dQCI table
FIG. 2

| Version | IHL | TOS | Total Length | |
|---|---|---|---|---|
| Identification | | | Flag | Fragment Offset |
| TTL | Protocol | | Header Checksum | |
| Source Address | | | | |
| Destination Address | | | | |
| Options | | | | |
| Data | | | | |

FIG. 4

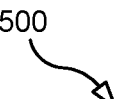
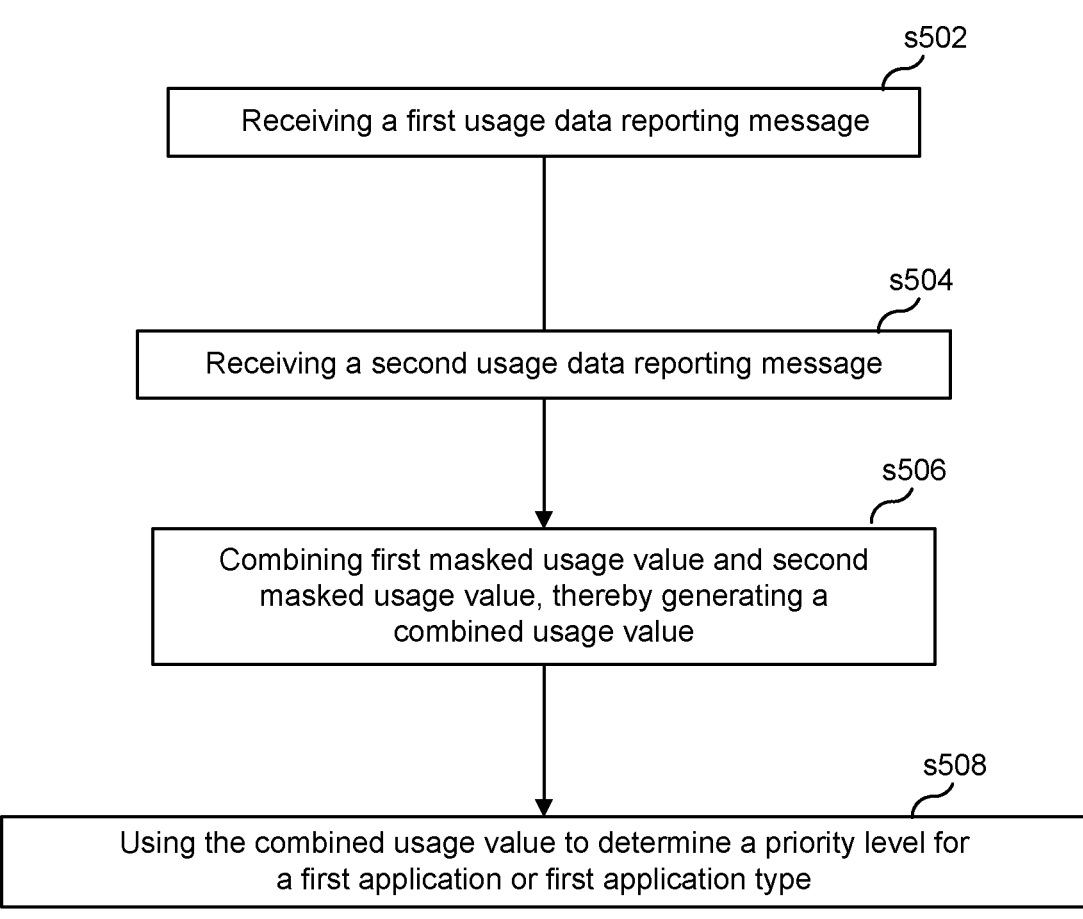
FIG. 5

600

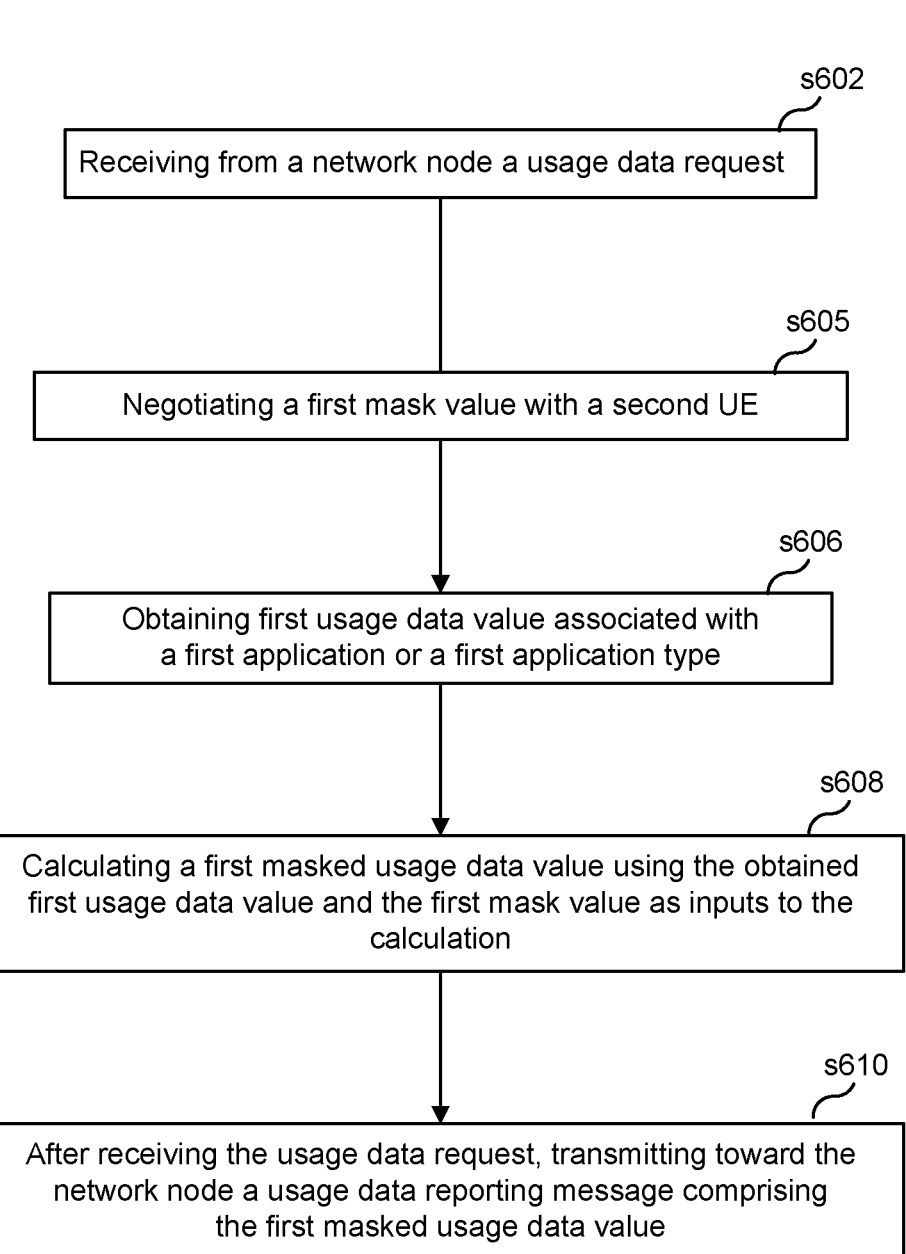

s602

Receiving from a network node a usage data request s605

Negotiating a first mask value with a second UE s606

Obtaining first usage data value associated with
a first application or a first application type s608

Calculating a first masked usage data value using the obtained
first usage data value and the first mask value as inputs to the
calculation s610

After receiving the usage data request, transmitting toward the
network node a usage data reporting message comprising
the first masked usage data value

FIG. 6

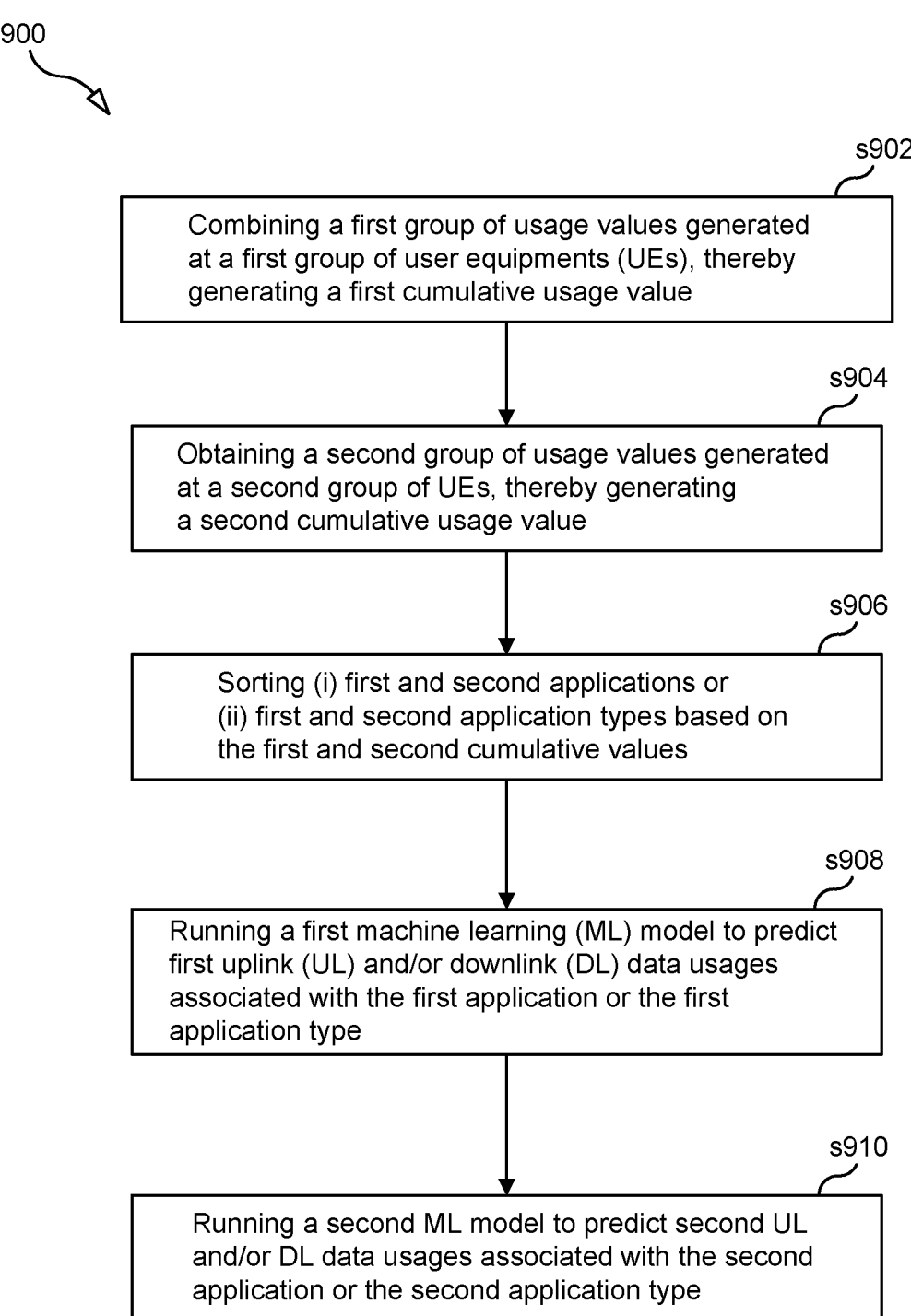

900 s902

Combining a first group of usage values generated at a first group of user equipments (UEs), thereby generating a first cumulative usage value s904

Obtaining a second group of usage values generated at a second group of UEs, thereby generating a second cumulative usage value s906

Sorting (i) first and second applications or (ii) first and second application types based on the first and second cumulative values s908

Running a first machine learning (ML) model to predict first uplink (UL) and/or downlink (DL) data usages associated with the first application or the first application type s910

Running a second ML model to predict second UL and/or DL data usages associated with the second application or the second application type

FIG. 9

OPTIMIZING USER EXPERIENCE IN ENCRYPTED TRAFFIC

CROSS REFERENCE TO RELATED APPLICATIONS

This application is a 35 U.S.C. § 371 National Stage of International Patent Application No. PCT/SE2020/051103, filed Nov. 18, 2020.

TECHNICAL FIELD

Embodiments herein relate generally to optimizing user experience in encrypted traffic.

BACKGROUND

The Quality-of-Service (QoS) Class Identifier (QCI) is a mechanism used in 3GPP Long Term Evolution (LTE) networks to ensure that traffic is allocated an appropriate Quality of Service (QoS). Typically, different types of traffic require different QoS and therefore different QCI values. Assigning the appropriate QCI value to the various different types of traffic can increase a user's Quality of Experience (QoE) because higher priority traffic will be treated accordingly.

Another technique that is used today to increase QoE is deep packet inspection (DPI). DPI can be used by a routing element in the network to determine the priority of a received packet. A downside of implementing DPI is that it consumes the routing element's processing resources, which means that it can be "costly" to perform a check for all incoming packets. Furthermore, DPI does not work well when the packets or portions of the packets are encrypted.

SUMMARY

Certain challenges presently exist. For example, in 3GPP LTE there is a finite number of defined QCI values and it can take much time to introduce a new QCI value to the standard.

Accordingly, some embodiments of this disclosure provide a privacy preserving technique for determining a priority level for an application (a.k.a., service) or an application type. This information can then be used for traffic shaping.

In one aspect, there is provided a method for determining a priority level for a first application or a first application type. The method comprises receiving a first usage data reporting message, the first usage data reporting message comprising a first masked usage value generated by a first UE using i) a first usage value associated with a first application or a first application type and ii) a mask value. The method further comprises receiving a second usage data reporting message, the second usage data reporting message comprising a second masked usage value generated by a second UE using i) a second usage value associated with the first application or the first application type and ii) the mask value. The method further comprises combining the first masked usage value and the second masked usage value, thereby generating a combined usage value. The method further comprises using the combined usage value to determine a priority level for the first application or the first application type.

In another aspect, there is provided a method performed by a first user equipment (UE). The method comprises receiving from a network node a usage data request, negotiating a first mask value with a second UE, and obtaining first usage data value associated with a first application or a first application type. The method further comprises calculating a first masked usage data value using the obtained first usage data value and the first mask value as inputs to the calculation and after receiving the usage data request, transmitting toward the network node a usage data reporting message comprising the first masked usage data value.

In another aspect, there is provided a method comprising_combining a first group of usage values generated at a first group of user equipments (UEs), thereby generating a first cumulative usage value. The first group of usage values is associated with a first application or a first application type. The method further comprises obtaining a second group of usage values generated at a second group of UEs, thereby generating a second cumulative usage value. The second group of usage values is associated with a second application or a second application type. The method further comprises_sorting (i) the first and second applications or (ii) the first and second application types based on the first and second cumulative usage values, running a first machine learning (ML) model to predict first uplink (UL) and/or downlink (DL) data usages associated with the first application or the first application type; and_running a second ML model to predict second UL and/or downlink DL data usages associated with the second application or the second application type.

In another aspect, there is provided a computer program comprising instructions which when executed by processing circuitry cause the processing circuitry to perform any of the methods described above.

In another aspect, there is provided a carrier containing the computer program described above. The carrier may be one of an electronic signal, an optical signal, a radio signal, and a computer readable storage medium.

In another aspect, there is provided an apparatus. The apparatus is configured to receive a first usage data reporting message, the first usage data reporting message comprising a first masked usage value generated by a first UE using i) a first usage value associated with a first application or a first application type and ii) a mask value. The apparatus is further configured to receive a second usage data reporting message, the second usage data reporting message comprising a second masked usage value generated by a second UE using i) a second usage value associated with the first application or the first application type and ii) the mask value. The apparatus is further configured to combine the first masked usage value and the second masked usage value, thereby generating a combined usage value; and use the combined usage value to determine a priority level for the first application or the first application type.

In another aspect, there is provided an apparatus. The apparatus is configured to receive from a network node a usage data request, negotiate a first mask value with a second UE and obtain first usage data value associated with a first application or a first application type. The apparatus is further configured to calculate a first masked usage data value using the obtained first usage data value and the first mask value as inputs to the calculation and after receiving the usage data request, transmit toward the network node a usage data reporting message comprising the first masked usage data value.

In another aspect, there is provided an apparatus. The apparatus comprises a memory; and processing circuitry coupled to the memory. The apparatus is configured to perform any of the above methods.

BRIEF DESCRIPTION OF THE DRAWINGS

The accompanying drawings, which are incorporated herein and form part of the specification, illustrate various embodiments.

FIG. 1 shows an exemplary communication system according to some embodiments.

FIG. 2 shows a method according to some embodiments.

4 transmission rate is much higher than the data transmission rate of 4G (LTE) network, the QoS to the end user is of high importance. The small cell radios deployed in such networks with macro radio base stations create a redundant cell coverage of both low and high frequencies and may be subject to interference affecting data transmission rate.

One of major obstacles of optimizing QoS in a radio telecommunication network is determining what each user equipment (UE) is doing, the type of data being transmitted, and the context of the UE operation.

Table 1 below shows QCI classes as defined in 3GPP TS 23.203—"Policy and Charging Control Architecture."

TABLE 1

| QCI | Resource Type | Priority | Package Delay Budget | Packet Error Loss Rate | Examples Services |
|---|---|---|---|---|---|
| 1 | GBR | 2 | 100 ms | $10^{-2}$ | Conversational Voice |
| 2 | GBR | 4 | 150 ms | $10^{-3}$ | Conversational Video (Live Streaming) |
| 3 | GBR | 3 | 50 ms | $10^{-3}$ | Real Time Gaming, V2X messages |
| 4 | GBR | 5 | 300 ms | $10^{-6}$ | Non-Conversational Video (Buffered Streaming) |
| 65 | GBR | 0.7 | 75 ms | $10^{-2}$ | Mission Critical user plane Push To Talk voice (e.g., MCPTT) |
| 66 | GBR | 2 | 100 ms | $10^{-2}$ | Non-Mission-Critical user plane Push To Talk voice |
| 75 | GBR | 2.5 | 50 ms | $10^{-2}$ | V2X messages |
| 5 | non-GBR | 1 | 100 ms | $10^{-6}$ | IMS Signalling |
| 6 | non-GBR | 6 | 300 ms | $10^{-6}$ | Video (Buffered Streaming) TCP-Based (for example, www, email, chat, ftp, p2p and the like) |
| 7 | non-GBR | 7 | 100 ms | $10^{-3}$ | Voice, Video (Live Streaming), Interactive Gaming |
| 8 | non-GBR | 8 | 300 ms | $10^{-6}$ | Video (Buffered Streaming) TCP-Based (for example, www, email, chat, ftp, p2p and the like) |
| 9 | non-GBR | 9 | 300 ms | $10^{-6}$ | Video (Buffered Streaming) TCP-Based (for example, www, email, chat, ftp, p2p and the like). Typically used as default bearer |
| 69 | non-GBR | 0.5 | 60 ms | $10^{-6}$ | Mission Critical delay sensitive signaling (e.g., MC-PTT signaling) |
| 70 | non-GBR | 5.5 | 200 ms | $10^{-6}$ | Mission Critical Data (e.g. example services are the same as QCI 6/8/9) |
| 79 | non-GBR | 6.5 | 50 ms | $10^{-2}$ | V2X messages |
| 80 | non-GBR | 6.8 | 10 ms | $10^{-6}$ | Low latency eMBB applications (TCP/UDP-based); Augmented Reality |
| 82 | GBR | 1.9 | 10 ms | $10^{-4}$ | Discrete Automation (small packets) |
| 83 | GBR | 2.2 | 10 ms | $10^{-4}$ | Discrete Automation (big packets) |
| 84 | GBR | 2.4 | 30 ms | $10^{-5}$ | Intelligent Transport Systems |
| 85 | GBR | 2.1 | 5 ms | $10^{-5}$ | Electricity Distribution-high voltage |

FIG. 4 is an example of IPv4 header.

FIG. 5 shows a method according to some embodiments.

FIG. 6 shows a method according to some embodiments.

Figure 7:
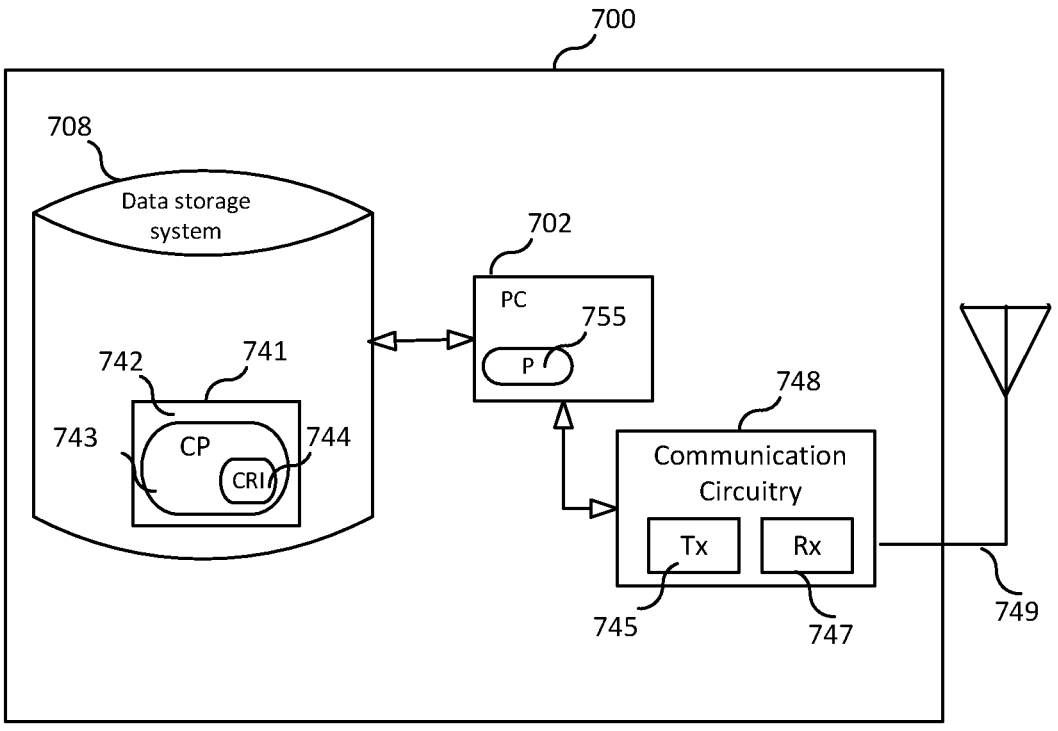

FIG. 7 shows an apparatus according to some embodiments.

Figure 8:
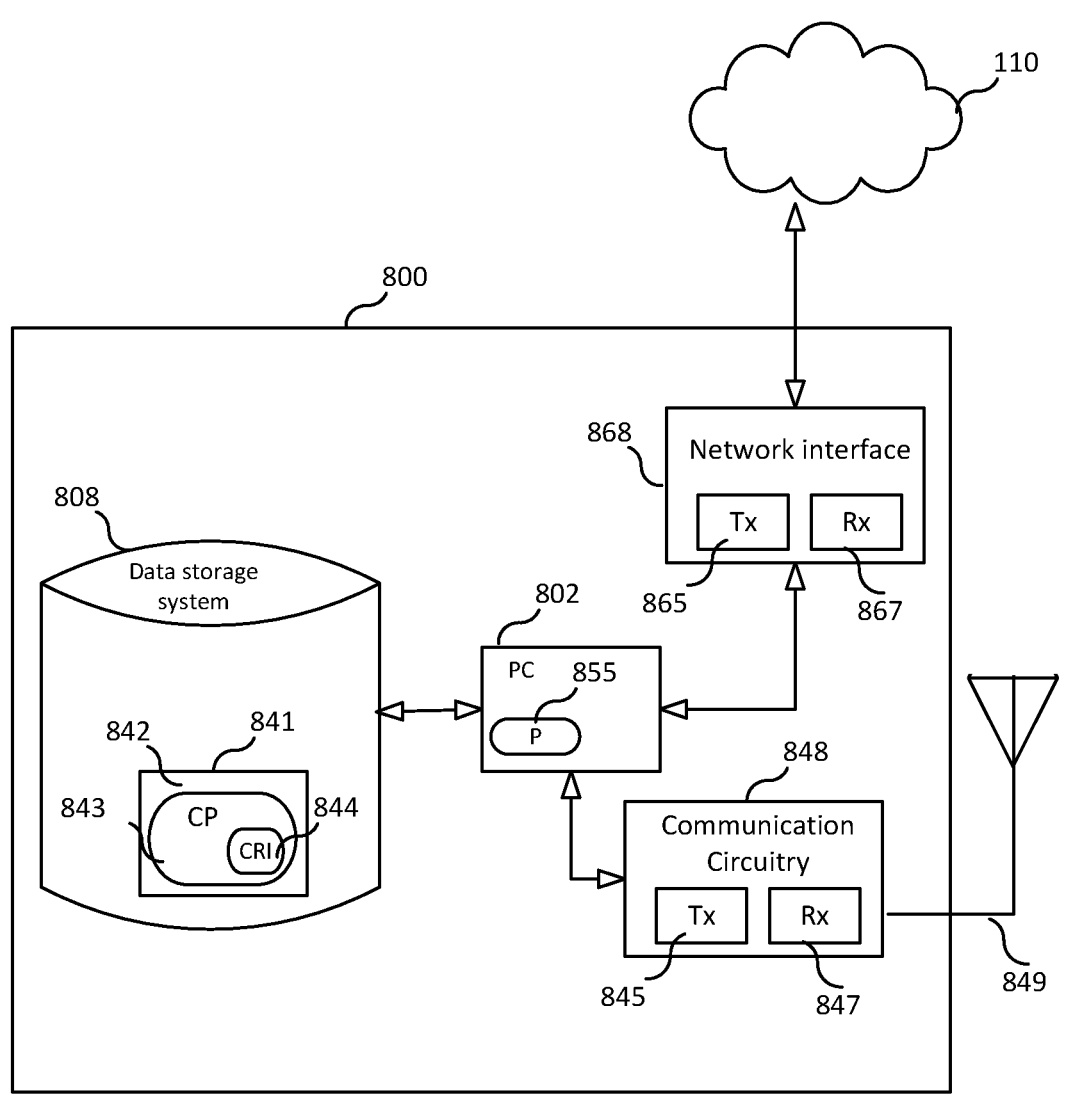

FIG. 8 shows an apparatus according to some embodiments.

FIG. 9 shows a method according to some embodiments.

DETAILED DESCRIPTION

In 5G radio networks (especially in mmWave radio networks) where high frequency signals are used and the data The QCI classes shown in Table 1 are inherently limited since these classes are hard-coded and predefined. Also the QCI classification may invade privacy since it may indicate what kind of data a UE transmits and/or receives.

Typically, QCI classes are allocated by way of a bearer ID which is associated with a user's subscription in the Home Subscriber Server (HSS) database. When a user activates a subscriber identification module (SIM) card and the UE attaches to a network, the default bearer is chosen for that user (typically QCI=9) and the user starts transmitting data.

FIG. 1 shows an exemplary wireless communication system 100 according to some embodiments. The system 100 comprises UE 102, UE 104, and a network entity 106. UEs 102 and/or 104 may be any device capable of connecting to a wireless communication network. For example, UEs 102 and/or 104 may be any one of a mobile phone, a computer, a tablet, a vehicle, or an Internet-of-Thing (IoT) device.

Network entity 106 may be any entity involved in providing the wireless communication network to UEs 102 and 104. For example, in FIG. 1, network entity 106 is a base station (BS) (e.g., eNB, gNB, etc.). The number of components (e.g., UEs) shown in FIG. 1 is provided for illustration purpose only and does not limit the embodiments of this disclosure in any way.

FIG. 2 shows a method 200 performed by system 100 according to some embodiments. Method 200 may begin with step s202.

Step s202 comprises producing a dQCI table. Step s202 may be performed periodically. In some embodiments, the dQCI table may be produced (constructed) on a per site basis. For example, a dQCI table may be produced for each BS included in a network.

Initially the dQCI table is empty and all data traffic that is carried in a network (e.g., 3GPP network) (or a portion of the network) at this stage is considered equal and receives the same priority.

To construct a dQCI table, data usage associated with a particular application or a particular application type must be obtained. Thus, in some embodiments, each UE's operating system identifies the UE's data usage such as how much time each application occupies the CPU of the UE and/or how much the screen and/or the network resources of the UE are used for each application. These different types of UE data usage associated with a particular application or a particular application type may be normalized and/or combined. In this disclosure, these different types of UE data usage associated with a particular application or a particular application type will be referred as "frequency" of an application.

To preserve privacy, each UE's application frequency is not shared directly, but instead UEs are grouped in pairs and masks are used to obfuscate each particular UE's application frequency. Thereafter, the masked frequencies can be obtained by network entity 106, which then combines the masked frequencies to produce a combined frequency value that is the sum of the individual frequency values. However, the network entity 106 is not able to determine each individual UE's application frequency. In this way, privacy is preserved.

Once the list of frequencies has been generated for all or a subset of applications running on each device, the process proceeds to collaboratively train individual machine learning models for each application in order to determine how much uplink (UL)/downlink (DL) is needed at different points in time. To train the ML models, a feature space that contains features (e.g., usage data) for previous n time slots for UL and/or DL may be collected. The ML models may be trained as a regression problem to produce uplink and downlink n time steps ahead of time.

In some embodiments, separate ML models may be provided and trained for UL and DL. This approach will require an additional iteration, but each model is very likely to have a simpler neural architecture.

Referring back to FIG. 2, step s204 is an optional step of verifying if the entries in the dQCI table produced in step s202 are valid. This can be accomplished by comparing the popularity of each entry in the dQCI table (e.g., how often a particular application was executed) to the frequency each of IP addresses in the routing table of BS 106 (e.g., how often a particular IP address associated with a particular application was requested). If a discrepancy is detected, the entry of the dQCI table is flagged for review. Such flagging may lead to a regeneration of the dQCI table or an override of the corresponding entry of the dQCI table using local information in case the discrepancy persists.

Step s206 comprises using the dQCI table standalone and/or with legacy QCI tables.

1.1 Collecting Data Usages

Figure 3:
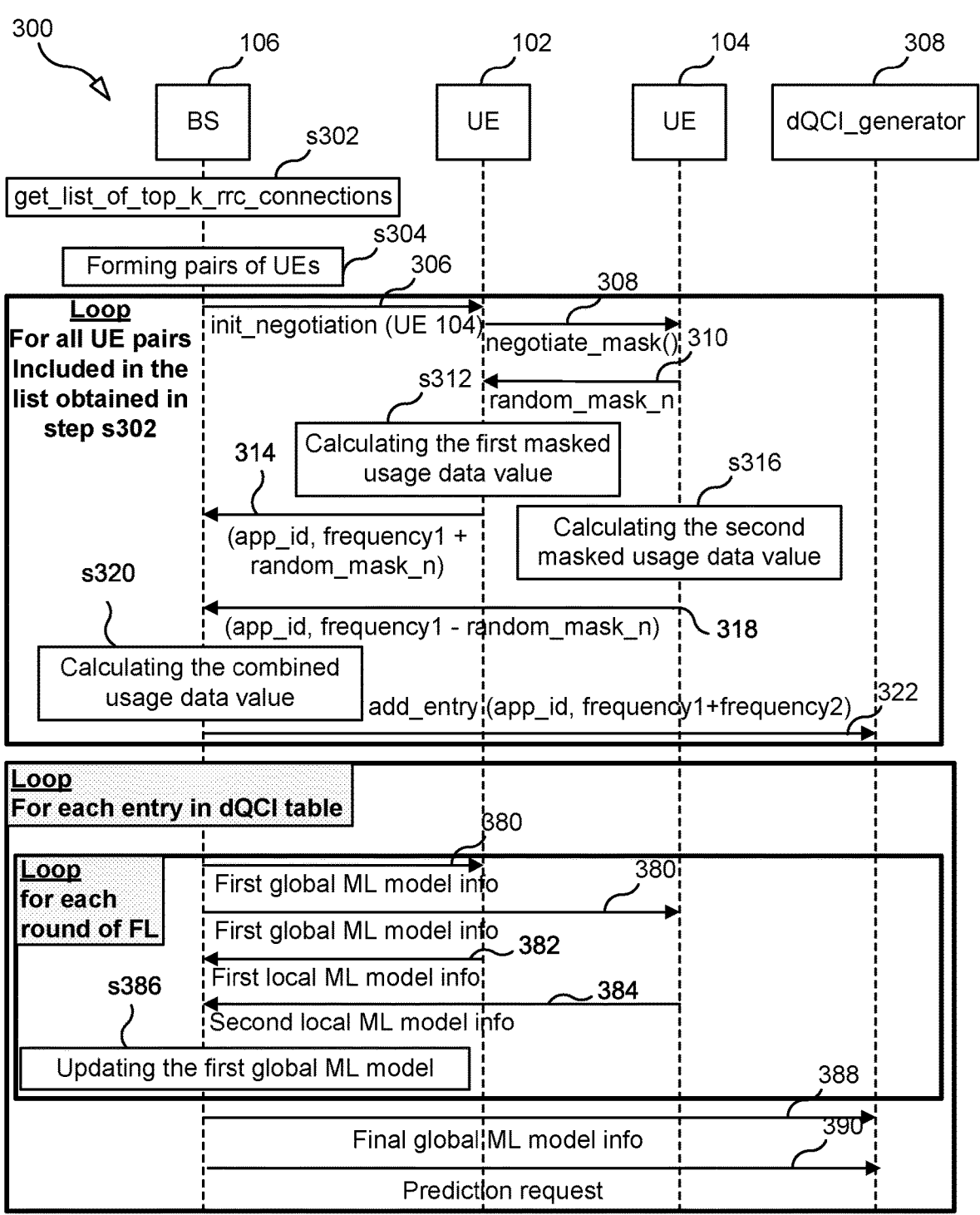
FIG. 3 shows a process according to some embodiments.

FIG. 3 shows an exemplary process 300 for producing a dQCI table in step s202. Process 300 may begin with step s302. Even though FIG. 3 shows that each step included in process 300 is performed by a single entity, each step may be performed by more than one entity. For example, step s302 may be performed by multiple BSs and step s306 may be performed by multiple UEs. Also, in process 300, every request is assumed to be successfully received hence ACK responses are omitted for simplicity.

In step s302, BS 106 identifies a group of UEs that are to be used for producing a dQCI table. The group of UEs that are to be used for producing a dQCI table may be top N UEs (where N is any positive integer greater than or equal to 2) that are most frequently connected to BS 106. Alternatively, the group of UEs may be M UEs (where M is any positive integer greater than or equal to 2) that transmit and/or receive the most amount of data via BS 106. In other embodiments, the group of UEs that are to be used for producing a dQCI table may be top O UEs (where O is any positive integer greater than or equal to 2) that are ranked based on a combination of the duration of the connection between each UE and BS 106 and the amount of data each UE transmits and/or receives via BS 106.

To identify the group of UEs that are to be used for producing a dQCI table, BS 106 may store UE connection history. The UE connection history may include a list of UEs that have been in a connected state (e.g., RRC_CONNECTED state) with respect to BS 106, and a duration of the connection between each UE and BS 106. Instead of or in addition to the duration of the connection between each UE and BS 106, the UE connection history may include an amount of data each UE transmitted and/or received via BS 106.

In other embodiments (e.g., in the embodiments where older generation wireless communication technology (e.g., pre-4G) is used), instead of BS 106, a network entity that is different from BS 106 (e.g., a radio network controller (RNC)) may store the UE connection history.

After identifying the group of UEs that are to be used for producing a dQCI table, in step s304, BS 106 forms one or more pairs of UEs from the group of UEs. For example, BS 106 may pair UE 102 with UE 104. Different methods may be used to form the pairs of UEs. For example, the group of UEs identified in step s302 may be split into two groups (i.e., first and second groups), and form a pair of UEs by selecting one UE from the first group and another UE from second group. Forming the pairs of UEs may be performed randomly or based on a predefined rule.

After forming the one or more pairs of UEs, for each pair, BS 106 may ask one UE of the pair to negotiate a mask with the other UE of the pair. For example, in case UEs 102 and 104 are one of pairs of UE formed in step s304, BS 106 may transmit toward UE 102 a usage data request 306. Usage data request 306 is configured to trigger UE 102 to transmit toward UE 104 a request 308 for a mask value.

In case UE 102 cannot communicate directly with UE 104, UE 102 may transmit mask value request 308 toward UE 104 via BS 106 which would act as a proxy for delivering mask value request 308.

After receiving mask value request 308, UE 104 may transmit toward UE 102 a message containing a mask value 310. Mask value 310 may be selected by UE 104 randomly or in a predefined manner.

After receiving mask value 310, in step s312, UE 102 may calculate a first masked usage data value. The first masked usage data value may be calculated using a first usage data value and the received mask value 310. In one embodiment, the first usage data value corresponds to UE 102's usage of a particular application (e.g., Facebook) or a particular application type (e.g., Social Media). The first usage data value may be determined based on any one or a combination of the followings: (1) a number of times the particular application or applications of the particular application type were used by UE 102 during a certain time period and (2) a duration during which a CPU, a screen, a microphone, and/or a camera of UE 102 was used for the particular application or applications of the particular application type. For example, the first usage data value may simply be the number of times the particular application or applications of the particular application type were used by UE 102 during a certain time period. In another example, the usage data value may be a sum of or a weighted sum of (1) and (2).

After determining the first usage data value, the first masked usage data value may be calculated. There are different ways of calculating the first masked usage data value. For example, V1masked=V1+M or V1masked=V1-M, where V1masked is the first masked usage value, V1 is the first usage value, and M is the mask value.

After calculating the first masked usage data value, UE 102 may transmit toward BS 106 a first usage data reporting message 314 comprising the first masked usage data value and a first app identifier identifying a particular application or a particular application type associated with the first masked usage data value.

In step s316, UE 104 may calculate a second masked usage data value. The second masked usage data value may be calculated using second usage data value and mask value 310. The second usage data value corresponds to UE 104's usage of a particular application (e.g., Facebook) or a particular application type (e.g., Social Media). The second usage data value may be determined based on any one or a combination of the followings: (1) a number of times the particular application or applications of the particular application type were used by UE 104 during a certain time period and (2) a duration during which a CPU, a screen, a microphone, and/or a camera of UE 104 was used for the particular application or applications of the particular application type. For example, the second usage data value may simply be the number of times the particular application or applications of the particular application type were used by UE 104 during a certain time period. In another example, the usage data value may be a sum of or a weighted sum of (1) and (2).

After determining the second usage data value, the second masked usage data value may be calculated. There are different ways of calculating the second masked usage data value. For example, if V1masked=V1+M, then V2masked=V2-M, where V2 is the second usage value. Similarly, if V1masked=V1-M, then V2masked=V2+M.

After calculating the second masked usage data value, UE 104 may transmit toward BS 106 a second usage data reporting message 318 comprising the second masked usage data value and a second app identifier identifying a particular application or a particular application type associated with the second masked usage data value.

Even though FIG. 3 shows that performing step s316 and sending the second usage data reporting message 318 occur after performing step s312 and sending the first usage data reporting message 314, they may occur before performing step s312 and sending the first usage data reporting message 314.

In the embodiments described above, mask value 310 is generated by UE 104. In other embodiments, however, the mask value may be generated by UE 102. In such embodiments, instead of transmitting mask value request 308 and receiving mask value 310, UE 102 may simply transmit toward UE 104 the mask value generated by UE 102.

After receiving the first and second usage data reporting messages 314 and 318, in step s320, BS 106 may combine the first masked usage data value and the second masked usage data value, thereby generating a combined usage data value. Because the purpose of combining the first and second masked usage data values is to determine total usage data value associated with a particular application or a particular application type, the first and second masked usage data values can be combined only if the particular application or the particular application type identified by the first app identifier is same as the particular application or the particular application type identified by the second app identifier. There are various ways of combining the first and second masked usage data values. For example, the first and second masked usage data values may be combined by adding the first and second masked usage data values. Thus, in case the first masked usage data value is V1masked=V1+M and the second masked usage data value is, then V2masked=V2-M, the combined usage data value (i.e., V1masked+V2masked) would equal V1+V2. By adding the first and second masked usage data values, thereby cancelling out the mask value, a summation of the first and second (unmasked) usage data values may be obtained.

After combining the first and second masked usage data values, BS 106 may transmit toward dQCI generator 308 (which may serve as a local registry) a combined usage data reporting message 322 including the combined usage data value. Even though FIG. 3 shows that dQCI generator 308 is separate from BS 106, in some embodiments, dQCI generator 308 may be included in BS 106.

Also, in some embodiments, the first and second masked usage data values may be combined at the dQCI table instead of BS 106. TABLE 2 provided below illustrates how usage data values of UEs are stored and updated in BS 106 and the dQCI table in such embodiments.

TABLE 2

Iteration 1 eNB { "c3BvdGlmeQ==" : 8 , "ZmFjZWJvb2s=" : 5 } # state of eNB (coming from UE_A)

{ } # state of dQCI table add_entry eNB { "c3BvdGlmeQ==" : 8 , "ZmFjZWJvb2s=" : 5 } to dQCI table { "c3BvdGlmeQ==" : 8 , "ZmFjZWJvb2s=" : 5 } # updated state of dQCI table TABLE 2-continued Iteration 2 eNB { "c3BvdGlmeQ==" : 3 , "ZmF]ZWJvb2s=" : 2 } # state of eNB (coming from UE_B)
 "c3BvdGlmeQ==" : 8 , "ZmF]ZWJvb2s=" : 5 ) # state of dQCI table
add_entry eNB { "c3BvdGlmeQ==" : 3 , "ZmFjZWJvb2s=" : 2 } to dQCI table
 { "c3BvdGlmeQ==" : 11 , "ZmFjZWJvb2s=" : 7 "] # updated state of dQCI table 1.2 Federated Learning (FL)

Process 300 shown in FIG. 3 may further comprise a sub-process for constructing a machine learning (ML) model for determining UL and/or DL resource requirements for a particular application (e.g., Facebook) or a particular application type (e.g., Social Network). In some embodiments, the UL and/or DL resource requirements correspond to the amount of UL data and/or DL data UE is required or expected to use when the UE runs a particular application or applications of a particular type. The UL and/or DL resource requirements may be directed to a certain time interval. For example, the ML model may predict the amount of UL data and/or DL data UE 102 is required or expected to transmit and/or receive via a wireless network provided by BS 106 when UE 102 runs a particular application or applications of a particular type during a certain time interval (e.g., between 12 pm and 2 pm).

Different learning processes may be used to construct the ML model. One of the learning processes is federated learning (FL) process 350 illustrated in FIG. 3.

In FL process 350, BS 106 may begin the process by transmitting toward each of UEs 102 and 104 global ML model information 380 identifying first global ML model. In some embodiments, the first global ML model is a long short-term memory (LSTM) model. But any other types of ML model may be used for the first global ML model. BS 106 may store a list of global ML models each associated with a particular application or a particular application type. For example, BS 106 may store a global ML model for Facebook application and a different global ML model for Twitter application.

The first global ML model may be configured to determine the amount of UL data and/or DL data each of UEs 102 and 104 is required or expected to use when each UE runs a particular application or applications of a particular type during a certain time interval. Because the first global ML model is associated with a particular application or a particular application type, first global ML model information 380 identifies not only the first global ML model but also a particular application or a particular application type associated with the first global ML model.

For example, global ML model information 380 may include a first global ML model identifier identifying the first global ML model and an application identifier identifying the particular application associated with first global ML model.

Also because the first global ML model may be associated with DL data only, UL data only, or both of DL data and UL data, global ML model information 380 may also include an indicator indicating whether the first global ML model is for DL data and/or UL data.

Furthermore, because the first global ML model may be associated with a certain time interval (e.g., between 12 pm and 2 pm), global ML model information 380 may also include time information identifying the time interval. In case the first global ML model is associated with both of DL data and UL data, the time information may separately identify the time interval for UL data and the time interval for DL data.

After receiving global ML model information 380, each of UEs 102 and 104 may train the first global ML model using historical data available at each UE. In some embodiments, the historical data may indicate how much UL data and/or DL data the UE used for a particular application or a particular application type during a certain interval. Table 2 provided below shows a conceptual view of exemplary information stored in the UE.

TABLE 2

| app_id | time_interval 0 (UL, DL) | time_interval 1 (UL, DL) |
|---|---|---|
| app_id #1 (Facebook) | 50 MB, 100 MB | 20 MB, 40 MB |
| app_id #2 (Twitter) | 60 MB, 190 MB | 40 MB, 50 MB |
| . | . | . |
| . | . | . |
| . | . | . |

As shown in Table 2, each UE stores UL data and/or DL data each UE used for particular applications during a certain interval. Additionally or alternatively, each UE may also store UL data and/or DL data each UE used for particular application types during a certain interval (e.g., Game, Social Network, etc.).

UE 102 may train the first global ML model, thereby generating first local ML model. In other words, the first local ML model is obtained a result of training the first global ML model using data locally available at UE 102. Similarly, UE 104 may train the first global ML model, thereby generating second local ML model. The second local ML model is obtained a result of training the first global ML model using data locally available at UE 104.

Training the first global ML model may involve changing weights of the first global ML model such that the first global ML model (e.g., for app_id #1 in Table 2 above) is trained to output UL data and/or DL data (e.g., 50 MB, 100 MB in Table 2 above) stored in UE based on inputted time interval (e.g., time_interval 0). The first global ML model may be only for one of UL data and DL data. In some other embodiments, however, the first global ML model may be for both of UL data and DL data.

After training the first global ML model at UE 102, thereby generating the first local ML model, UE 102 may transmit toward BS 106 first local ML model information 382 identifying the first local ML model. Similarly, after training the first global ML model at UE 104, thereby generating the second local ML model, UE 104 may transmit toward BS 106 second local ML model information 384 identifying the second local ML model.

After receiving the first and second local ML model information 382 and 384, in step s386, BS 106 may update the first global ML model by combining the first and second local ML models. For example, BS 106 may average or weighted-average the weights of the first and second local ML models, thereby generating a second global ML model. The first global ML model may be updated by replacing the first global ML model with the second global ML model. In case a weighted averaging is used, higher weight(s) may be assigned to the local ML model generated by the UE that is ranked higher in the list made in step s302. For example, if UE 102 is ranked at a higher position than UE 104 in the list discussed in step s302, higher weight(s) would be given to the first local ML model that is generated by UE 102 as compared to the second local ML model that is generated by UE 104. Additionally or alternatively, different weight(s) may be assigned to local ML model(s) based on the amount of samples each local ML model used in its training process. For example, if the first local ML model used a first amount of samples for the training and the second local ML model used a second amount of samples for the training and the first amount is less than the second amount, higher weight(s) would be given to the second local ML model.

After obtaining the second global ML model, the above steps of FL process 350 may be repeatedly performed. More specifically, after obtaining the second global ML model, BS 106 may transmit toward UEs 102 and 104 second global ML model information identifying the second global ML model. Each of UEs 102 and 104 may train the second global ML model using historical data locally available at each UE and may transmit the trained local ML models toward BS 106. BS 106 may combine the trained local ML models, thereby generating a third global ML model.

After repeating the above steps of FL process 350 a number of rounds, a final global ML model may be obtained. After obtaining the final global ML model, BS 106 may transmit toward dQCI generator 308 final global ML model information 388 identifying the final global ML model.

BS 106 may also transmit toward dQCI generator 308 a prediction request 390 requesting dQCI generator 308 to predict UL data and/or DL data each UE is expected to or required to use for a given time_interval. Prediction request 390 may include an application identifier identifying a particular application and one or more time intervals for the prediction.

After receiving the final global ML model information 388, dQCI generator 308 may use the final global ML model to predict UL data and/or DL data each UE is expected to or required to use for a given time slot. For example, dQCI generator 308 may use the final global ML model to predict UL data and/or DL data each UE is expected to or required to use for today based on UL data and/or DL data used yesterday. The prediction may be triggered by a network entity such as BS 106. BS 106 may record how much UL/DL data was used for each app_id everyday in order to use that as input for the predictive model. Table 3 shown below is a conceptual view of exemplary information stored in UE 104.

TABLE 3

| App-id | Priority | Uplink t1 | Uplink t2 | Downlink t1 | Downlink t2 |
|---|---|---|---|---|---|
| c3BvdGlmeQ== | 8 | 100 | 50 | 200 | 100 |
| ZmFjZWJvb2s= | 5 | 50 | 100 | 900 | 50 |

To further improve user privacy, in different embodiments of this disclosure, Shamir's algorithm may be used. In those embodiments, an n-order polynomial is created (where n is the number of users connected to the RBS) and the solutions (also known as roots) of that polynomial would be each UE's frequency of app usage. This embodiment prevents revealing which user has which frequency. The downside of this embodiment is that it is computationally more expensive and requires more message exchanges with each other to identify hints on how to solve that equation. This embodiment, however, further improves privacy protection since if a user provides a false hint it is very likely that that user has entered this negotiation inappropriately and as such it can be ruled out from the exchange.

2. (Optional) Verification

This verification step is concerned with whether or not usage data values produced by UEs 102 and 104 connected to BS 106 (assuming that UEs 102 and 104 are the only UEs connected to BS 106) correspond to (e.g., are consistent with) the number of requests made to BS 106 while routing traffic. To identify any mismatches, the following process may be performed.

First, the entries of the dQCI table are sorted based on the priority levels of the entries.

Second, the entries of the routing table are sorted based on the number of times (i.e., the frequency) each IP address was requested.

Third, each IP address in the routing table is replaced with a corresponding application ID (e.g., App_ID c3BvdGlmeQ==is for Facebook and the IP address for Facebook is 176.13.69.63).

Fourth, the relative order of the list in the dQCI table and the relative order of the list in the routing table are compared to determine if there is any mismatch, and the determined mismatched entries are flagged.

The process may be described with pseudo-code below.

```
sorted_dQCI = sort(dQCI.entries, timespan)
sorted_IPs = sort(router.routingTable.groupBy(IPaddress).sum( ), timespan)
mapped_sorted_IPs = map( IP2app_id, sorted_IPs)
flagged_entries = [ ]
for I in range(len(sorted_dQCI)):
        if ( I != mapped_sorted_IPs.indexOf(sorted_dQCI[i] ) ):
                flagged_entries.append(sorted_dQCI[i])
```

After flagging the mismatched entries, step s202 shown in FIG. 2 may be performed again only for the mismatched entries. But if the discrepancy persists—e.g., if a particular application ID is flagged once more—in subsequent iteration(s) of performing step 202, the information included in the routing table supersedes and replaces the information in the dQCI table.

In other embodiments, consensus algorithms may be used to settle such discrepancies among multiple RBSs by performing a voting round to identify the most general frequency of each application among multiple users beyond the vicinity of a single RBS.

3. Using dQCI Table(s) for Prioritization and Resource Allocation

Referring back to FIG. 2, after performing the optional step s204, step s206 may be performed. Step s206 comprises using dQCI table(s) for prioritization and resource allocation.

More specifically, upon receiving Internet Protocol (IP) data packet from UE 102, BS 106 may unpack only initial part of the IP header of the data packet. Because the initial part of the IP header identifies a particular application or a particular application type that is uniquely associated with the data packet, by using the dQCI table, BS 106 may determine the priority level and the resource allocations associated with the identified application or the identified application type. Using the determined priority level and the resource allocations, BS 106 may prioritize the data packet and to allocate expected UL and/or DL resources for the data packet.

In some embodiments, UE 102 may annotate an IP packet with a unique application identifier or a unique application type identifier, which have been assigned when the dQCI table was created. The unique application identifier or the unique application type identifier may be stored in the options segment (e.g., 402) of the IP header (e.g., 400 shown in FIG. 4).

dQCI tables may be generated based on an RBS basis. In other words, a unique dQCI table may be generated for each RBS. The dQCI table associated with each RBS may be used directly within each RBS (low-granularity). Additionally or alternatively, the multiple dQCI tables for multiple RBS may be combined into one dQCI table.

4. Aggregation of dQCI Tables

In some embodiments, two or more dQCI tables each of which was created by a respective BS (e.g., eNB, gNB, etc.) can be aggregated (combined) into a single dQCI table in order to reduce the number of dQCI tables existing in a network formed by multiple BSs. There are various ways of combining multiple dQCI tables into a single dQCI table. For example, two dQCI tables may be combined based on the following rules:

> (1) Rule #1—If an entry from one of the two tables does not exist in another table, the entry is added to a final dQCI table. Taking dQCI tables #1 and #2 shown below as an example, dQCI table #1 lacks the entry corresponding to App_ID #N+1 (e.g., Instagram) which exists in dQCI table #2. Thus, as shown below, the entry corresponding to App_ID #N+1 is added to the final dQCI table.

dQCI Table #1

| App_ID | Priority Level | ... | UL Data |
|---|---|---|---|
| App_ID #1 (e.g., Facebook) | 2 | ... | 50 MB |
| App_ID #2 (e.g., Twitter) | 3 | ... | 160 MB |
| . | . | ... | . |
| . | . | | . |
| . | . | | . |
| App_ID #N | 5 | ... | 100 MB | dQCI Table #2

| App_ID | Priority Level | ... | UL Data |
|---|---|---|---|
| App_ID #1 (e.g., Facebook) | 5 | ... | 50 MB |
| App_ID #2 (e.g., Twitter) | 3 | ... | 80 MB |
| . | . | ... | . |
| . | . | | . |
| . | . | | . |
| App_ID #N + 1 (e.g., Instagram) | 5 | ... | 100 MB |

Final dQCI Table

| App_ID | Priority Level | ... | UL Data |
|---|---|---|---|
| App_ID #1 (e.g., Facebook) | 5 | ... | 50 MB |
| App_ID #2 (e.g., Twitter) | 3 | ... | 160 MB |
| . | . | ... | . |
| . | . | | . |
| . | . | | . |
| App_ID #N + 1 (e.g., Instagram) | 5 | ... | 100 MB |

> (2) Rule #2—If an entry exists in both of the two tables, but the priority level of the entry indicated in one of the two tables is different from the priority level of the entry indicated in another one of the two tables, the entry is added to the final table with the higher priority level among the two different priority levels. Takings dQCI tables #1 and #2 above as an example, even though an entry corresponding to App_ID #1 exists in both tables, the priority level of App_ID #1 (level 2) indicated in the dQCI table #1 is different from the priority level of App_ID #1 (level 5) indicated in the dQCI table #2. Thus, in in the final dQCI table, the entry corresponding to App_ID #1 is added with the priority level of 5.

> (3) Rule #3—If an entry exists in both of the two tables but UL/DL data associated with the entry included in one of the tables does not match with UL/DL data associated with the entry included in another one of the two tables, the entry is added to the final dQCI table with higher UL/DL data among the two UL/DL data. Taking dQCI tables #1 and #2 above as an example, even though an entry corresponding App_ID #2 exists in both of the tables, the UL data corresponding to App_ID #2 in dQCI table #1 (i.e., 160 MB) is different from the UL data corresponding to App_ID #2 in dQCI table #2 (i.e., 80 MB). In such case, based on Rule #3, an entry corresponding to App_ID #2 is added to the final dQCI table with the higher UL data (i.e., 160 MB) indicated in dQCI table #1.

In some embodiments, by using the above rules for combining two dQCI tables, multiple dQCI tables and conventional QCI table(s) may be combined in a daisy chained manner. For example, if there are a first dQCI table, a second dQCI table, a conventional QCI table, and a third dQCI table in a network, the four tables in the network may be combined as follows: First, first and second dQCI tables are combined, thereby generating a first combined dQCI table. Second, the first combined dQCI table and the conventional QCI table are combined, thereby generating a second combined dQCI table. Third, the second combined dQCI tables and the third dQCI table are combined, thereby generating a final combined dQCI table.

5. Routing Traffic Between Different dQCI Tables

There may be a scenario where a dQCI table existing in a source network (i.e., the network where data traffic is coming from) ("source dQCI table") and a dQCI table existing in a target network (i.e., the network where data traffic is targeted towards) ("target dQCI table") have inconsistent entries. In such scenario, in some embodiments, the following rules may be used to route data traffic from the source network to the target network.

> (1) Rule #1—If the target dQCI table does not contain the entry associated with the data traffic (e.g., if the target dQCI table does not recognize the application ID associated with the data traffic), information regarding the entry (e.g., priority level, UL/DL data) included in the source dQCI table may be used. Taking the source and target dQCI tables shown below as an example, if the data traffic is associated with App_ID N+1 (e.g., Instagram) which does not exist in the target dQCI table, the information regarding App_ID N+1 (e.g., priority level of "5" and UL data of "100 MB") available at the source dQCI table may be used to route the data traffic.

Target dQCI Table

| App_ID | Priority Level | . . . | UL Data |
|---|---|---|---|
| App_ID #1 (e.g., Facebook) | 2 | . . . | 50 MB |
| App_ID #2 (e.g., Twitter) | 3 | . . . | 160 MB |
| . | . | . . . | . |
| . | . | | . |
| . | . | | . |
| App_ID #N | 5 | . . . | 100 MB |

Source dQCI Table

| App_ID | Priority Level | . . . | UL Data |
|---|---|---|---|
| App_ID #1 (e.g., Facebook) | 5 | . . . | 50 MB |
| App_ID #2 (e.g., Twitter) | 3 | . . . | 80 MB |
| . | . | . . . | . |
| . | . | | . |
| . | . | | . |
| App_ID #N + 1 (e.g., Instagram) | 5 | . . . | 100 MB |

In some embodiments, the IP header of the data traffic may comprise the options segment segment which includes the information regarding App_ID N+1 (e.g., priority level of "5" and UL data of "100 MB"), which is available at the source dQCI table.

In case the information regarding the entry available at the source dQCI table is used to route the data traffic, there may be a scenario where the priority level of the entry available at the source dQCI table (e.g., App_ID #N+1 is associated with the priority level of "5" at the source dQCI table) is same as the priority level of another entry available at the target dQCI table (e.g., App_ID #N is associated with priority level of "5" at the target dQCI table). In such case, the priority level of the entry corresponding to the data traffic (e.g., the priority level "5" for App_ID #N+1) is decreased until the priority level of the entry no longer conflicts with (i.e., is no longer same as) any other entry in the target dQCI table.

(2) Rule #2—If the entry associated with the incoming data traffic exists in both of the source dQCI table and the target dQCI table but the priority level of the entry in the source dQCI table and the priority level of the entry in the target dQCI table are different, the data traffic may be prioritized using the priority level indicated in the target dQCI table. Taking the source and target dQCI tables shown above as an example, if the incoming data traffic is associated with the entry App_ID #1 which exists in both of the source and target dQCI tables, since the priority level of App_ID #1 indicated in the source dQCI table is different from the priority level of App_ID #1 indicated in the source dQCI table, the data traffic may be prioritized using the priority level of App_ID #1 indicated in the target dQCI table.

(3) Rule #3—If the entry associated with the data traffic exists in both of the source dQCI table and the target dQCI table, but there is a mismatch between the UL/DL data associated with the entry in the source dQCI table and the UL/DL data associated with the entry in the target dQCI table, the UL/DL data associated with the entry in the target dQCI table is used. Taking the source and target dQCI tables shown above as an example, if the incoming data traffic is associated with App_ID #2 which exists in both of the source and target dQCI tables, since the UL data associated with App_ID #1 indicated in the source dQCI table is different from the UL data associated with App_ID #1 indicated in the source dQCI table, the data traffic may be prioritized using the UL data associated with App_ID #1 indicated in the target dQCI table.

FIG. 5 shows a process 500 for determining a priority level for a first application or a first application type. The process may begin with step s502.

Step s502 comprises receiving a first usage data reporting message. The first usage data reporting message comprises a first masked usage value generated by a first UE using i) a first usage value associated with a first application or a first application type and ii) a mask value.

Step s504 comprises receiving a second usage data reporting message. The second usage data reporting message comprises a second masked usage value generated by a second UE using i) a second usage value associated with the first application or the first application type and ii) the mask value.

Step s506 comprises combining the first masked usage value and the second masked usage value, thereby generating a combined usage value.

Step s508 comprises using the combined usage value to determine a priority level for the first application or the first application type.

In some embodiments, the second usage data value is associated with the first application type, and the second usage data value is determined based on a combination of two or more usage data values each of which is associated with an application of the first application type.

In some embodiments, $V1_{Masked} = V1_{Not\ Masked} + M$ or $V1_{Masked} = V1_{Not\ Masked} - M$, where $V1_{Masked}$ is the first masked usage value, $V1_{Not\ Masked}$ is the first usage value, and M is the mask value. Also $V2_{Masked} = V2_{Not\ Masked} - M$ or $V2_{Masked} = V2_{Not\ Masked} + M$, where $V2_{Masked}$ is the second masked usage value, $V2_{Not\ Masked}$ is the second usage value, and M is the mask value, and $V_{Combined} = V1_{Masked} + V2_{Masked}$, where $V_{Combined}$ is the combined usage value.

In some embodiments, the method further comprises transmitting toward the first UE a usage data request, wherein the usage data request is configured to trigger the first UE to transmit the mask value or a request for the mask value.

In some embodiments, using the combined usage value to determine a priority level for the first application or the first application type comprises transmitting toward a Quality Channel Indicator generator (dQCI generator) a message indicating the combined usage value, and the QCI generator determining the priority level for the first application or the first application type based on the combined usage value.

In some embodiments, the first usage data reporting message includes a first application identifier identifying the first application or the first application type, and the second usage data reporting message includes a second application identifier identifying the first application or the first application type.

In some embodiments, the first usage value indicates the amount of the first UE's usage of the first application or the first application type, and the second usage value indicates the amount of the second UE's usage of the first application or the first application type.

In some embodiments, the first UE's usage of the first application or the first application type corresponds to the number of times the first application and/or applications having the first application type was consumed at the first UE during a given time interval.

In some embodiments, the first UE comprises any one or a combination of a central processing unit (CPU), a display screen, a microphone, and/or a camera. The first UE's usage of the first application or the first application type corresponds to any one or a sum of: a duration of how long the CPU ran the first application or applications having the first application type within a given time interval, a duration of how long the display screen was used for the first application or applications having the first application type within the given time interval, a duration of how long the microphone was used for the first application or applications having the first application type within the given time interval, and a duration of how long the camera was used for the first application or applications having the first application type within the given time interval.

In some embodiments, the method further comprises identifying top N UEs that are most frequently connected to a network node, wherein N is a positive integer. forming a plurality of pairs of UEs among the identified top N UEs, wherein the first UE and the second UE form one pair of the plurality of pairs of UEs; and generating the usage data request, wherein the usage data request includes information identifying the second UE.

In some embodiments, the method further comprises transmitting toward the first UE and the second UE global machine learning (ML) model information identifying a global ML model. The global ML transmitted toward the first UE is configured to be trained at the first UE using local data available at the first UE and the global ML transmitted toward the second UE is configured to be trained at the second UE using local data available at the second UE. The global ML model is associated with the first application or the first application type, and the global ML model is configured to predict future network conditions of a network.

In some embodiments, the method further comprises (i) receiving from the first UE first local ML model information identifying a first locally trained ML model, (ii) receiving from the second UE second local ML model information identifying a second locally trained ML model, (iii) combining (e.g., averaging) the first local trained ML model and the second locally trained ML model, thereby generating an updated global ML model, and (iv) transmitting toward the first UE and the second UE updated global ML model information identifying the updated global ML model.

In some embodiments, the method further comprises repeating steps (i)-(iv) above, thereby generating a new global ML model.

In some embodiments, the method further comprises receiving from a plurality of UEs data packets. Each of the data packets includes an identifier identifying a different application or a different application type. The method further comprises unpacking only a part of each of the data packets to obtain the identifier; transmitting toward a dQCI table a request for data handling information, wherein the request includes the identifier; receiving from the dQCI table the data handling information; and performing any one or more of the followings: prioritizing, based on the received data handling information, the data packets, and allocating, based on the received data handling information, downlink (DL) resources or uplink (UL) resources for the data packets.

In some embodiments, process 500 is performed by a network entity, and the dQCI table is included in the network entity.

FIG. 6 shows a process 600 performed by a first user equipment (UE). Process 600 may begin with step s602.

Step s602 comprises receiving from a network node a usage data request.

Step s604 comprises negotiating a first mask value with a second UE.

Step s606 comprises obtaining first usage data value associated with a first application or a first application type.

Step s608 comprises calculating a first masked usage data value using the obtained first usage data value and the first mask value as inputs to the calculation.

Step s610 comprises after receiving the usage data request, transmitting toward the network node a usage data reporting message comprising the first masked usage data value.

In some embodiments, negotiating the first mask value with the second UE comprises: transmitting toward the second UE a request for the first mask value and receiving a response message including the first mask value, or transmitting toward the second UE the first mask value.

In some embodiments, the usage data reporting message includes an application identifier identifying the first application or the first application type.

In some embodiments, the first usage data value indicates the number of times the first application or applications having the first application type was ran at the first UE during a given interval.

In some embodiments, the first UE comprises a central processing unit (CPU), a display screen, a microphone, and/or a camera, and the first usage data value indicates any one or a sum of a duration of how long the CPU ran the particular application within a given time interval, a duration of how long the display screen was used for the particular application within the given time interval, a duration of how long the microphone was used for the particular application within the given time interval, and a duration of how long the camera was used for the particular application within the given time interval.

In some embodiments, the method further comprises receiving from the network node global machine learning (ML) model information identifying a global ML model. The global ML model is associated with the first application or the first application type, and the global ML model is configured to predict future network conditions of a network.

In some embodiments, the method further comprises training the global ML model using local data available at the first UE, thereby generating a locally trained ML model; and transmitting toward the network node local ML model information identifying the locally trained ML model.

FIG. 9 shows a process 900. Process 900 may begin with step s902.

Step s902 comprises combining a first group of usage values generated at a first group of user equipments (UEs), thereby generating a first cumulative usage value. The first group of usage values is associated with a first application or a first application type.

Step s904 comprises obtaining a second group of usage values generated at a second group of UEs, thereby generating a second cumulative usage value. The second group of usage values is associated with a second application or a second application type.

Step s906 comprises sorting (i) the first and second applications or (ii) the first and second application types based on the first and second cumulative usage values.

Step s908 comprises running a first machine learning (ML) model to predict first uplink (UL) and/or downlink (DL) data usages associated with the first application or the first application type.

Step s910 comprises running a second ML model to predict second UL and/or downlink DL data usages associated with the second application or the second application type.

FIG. 7 is a block diagram of UE 102 and/or UE 104, according to some embodiments. As shown in FIG. 7, UE 102 may comprise: processing circuitry (PC) 702, which may include one or more processors (P) 755 (e.g., one or more general purpose microprocessors and/or one or more other processors, such as an application specific integrated circuit (ASIC), field-programmable gate arrays (FPGAs), and the like); communication circuitry 748, which is coupled to an antenna arrangement 749 comprising one or more antennas and which comprises a transmitter (Tx) 745 and a receiver (Rx) 747 for enabling UE 102 to transmit data and receive data (e.g., wirelessly transmit/receive data); and a local storage unit (a.k.a., "data storage system") 708, which may include one or more non-volatile storage devices and/or one or more volatile storage devices. In embodiments where PC 702 includes a programmable processor, a computer program product (CPP) 741 may be provided. CPP 741 includes a computer readable medium (CRM) 742 storing a computer program (CP) 743 comprising computer readable instructions (CRI) 744. CRM 742 may be a non-transitory computer readable medium, such as, magnetic media (e.g., a hard disk), optical media, memory devices (e.g., random access memory, flash memory), and the like. In some embodiments, the CRI 744 of computer program 743 is configured such that when executed by PC 702, the CRI causes UE 102 to perform steps described herein (e.g., steps described herein with reference to the flow charts). In other embodiments, UE 102 may be configured to perform steps described herein without the need for code. That is, for example, PC 702 may consist merely of one or more ASICs. Hence, the features of the embodiments described herein may be implemented in hardware and/or software.

FIG. 8 is a block diagram of a network node (e.g., BS 106 shown in FIG. 1), according to some embodiments. As shown in FIG. 8, the network node may comprise: processing circuitry (PC) 802, which may include one or more processors (P) 855 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed (i.e., apparatus 800 may be a distributed computing apparatus); a network interface 868 comprising a transmitter (Tx) 865 and a receiver (Rx) 867 for enabling apparatus 800 to transmit data to and receive data from other nodes connected to a network 110 (e.g., an Internet Protocol (IP) network) to which network interface 848 is connected; communication circuitry 848, which is coupled to an antenna arrangement 849 comprising one or more antennas and which comprises a transmitter (Tx) 845 and a receiver (Rx) 847 for enabling the network node to transmit data and receive data (e.g., wirelessly transmit/receive data); and a local storage unit (a.k.a., "data storage system") 808, which may include one or more non-volatile storage devices and/or one or more volatile storage devices. In embodiments where PC 802 includes a programmable processor, a computer program product (CPP) 841 may be provided. CPP 841 includes a computer readable medium (CRM) 842 storing a computer program (CP) 843 comprising computer readable instructions (CRI) 844. CRM 842 may be a non-transitory computer readable medium, such as, magnetic media (e.g., a hard disk), optical media, memory devices (e.g., random access memory, flash memory), and the like. In some embodiments, the CRI 844 of computer program 843 is configured such that when executed by PC 802, the CRI causes the network node to perform steps described herein (e.g., steps described herein with reference to the flow charts). In other embodiments, the network node may be configured to perform steps described herein without the need for code. That is, for example, PC 802 may consist merely of one or more ASICs. Hence, the features of the embodiments described herein may be implemented in hardware and/or software.

While various embodiments are described herein, it should be understood that they have been presented by way of example only, and not limitation. Thus, the breadth and scope of this disclosure should not be limited by any of the above described exemplary embodiments. Moreover, any combination of the above-described elements in all possible variations thereof is encompassed by the disclosure unless otherwise indicated herein or otherwise clearly contradicted by context. Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for determining a priority level for a first application or a first application type, the method comprising:

receiving a first usage data reporting message, the first usage data reporting message comprising a first masked usage value calculated by a first UE using i) a first usage value associated with a first application or a first application type and ii) a mask value;

receiving a second usage data reporting message, the second usage data reporting message comprising a second masked usage value generated by a second UE using i) a second usage value associated with the first application or the first application type and ii) the mask value;

combining the first masked usage value and the second masked usage value, thereby generating a combined usage value; and using the combined usage value to determine a priority level for the first application or the first application type, wherein $V1_{Masked}=V1_{Not\ Masked}+M$ or $V1_{Masked}=V1_{Not\ Masked}-M$, where $V1_{Masked}$ is the first masked usage value, $V1_{Not\ Masked}$ is the first usage value, and M is the mask value, $V2_{Masked}=V2_{Not\ Masked}-M$ Or $V2_{Masked}=V2_{Not\ Masked}+M$, where $V2_{Masked}$ is the second masked usage value, $V2_{Not\ Masked}$ is the second usage value, and M is the mask value, and $V_{combined}=V1_{Masked}+V2_{Masked}$, where $V_{combined}$ is the combined usage value.

2. The method of claim 1, wherein
the second usage value is associated with the first application type, and
the second usage value is determined based on a combination of two or more usage values each of which is associated with an application of the first application type.

3. The method of claim 1, the method further comprising transmitting toward the first UE a usage data request, wherein the usage data request is configured to trigger the first UE to transmit the mask value or a request for the mask value.

4. The method of claim 3, the method further comprising:

identifying top N UEs that are most frequently connected to a network node, wherein N is a positive integer;

forming a plurality of pairs of UEs among the identified top N UEs, wherein the first UE and the second UE form one pair of the plurality of pairs of UEs; and generating the usage data request, wherein the usage data request includes information identifying the second UE.

5. The method of claim 1, wherein using the combined usage value to determine a priority level for the first application or the first application type comprises:

transmitting toward a Quality Channel Indicator generator (dQCI_generator) a message indicating the combined usage value, and the QCI generator determining the priority level for the first application or the first application type based on the combined usage value.

6. The method of claim 1, wherein the first usage data reporting message includes a first application identifier identifying the first application or the first application type, and the second usage data reporting message includes a second application identifier identifying the first application or the first application type.

7. The method of claim 1, wherein the first usage value indicates the amount of the first UE's usage of the first application or the first application type, and the second usage value indicates the amount of the second UE's usage of the first application or the first application type.

8. The method of claim 7, wherein the first UE's usage of the first application or the first application type corresponds to the number of times the first application and/or applications having the first application type was consumed at the first UE during a given time interval.

9. The method of claim 7, wherein the first UE comprises any one or a combination of a central processing unit (CPU), a display screen, a microphone, and/or a camera, and the first UE's usage of the first application or the first application type corresponds to any one or a sum of:

a duration of how long the CPU ran the first application or applications having the first application type within a given time interval, a duration of how long the display screen was used for the first application or applications having the first application type within the given time interval, a duration of how long the microphone was used for the first application or applications having the first application type within the given time interval, and a duration of how long the camera was used for the first application or applications having the first application type within the given time interval.

10. The method of claim 1, the method further comprising:

transmitting toward the first UE and the second UE global machine learning (ML) model information identifying a global ML model, wherein the global ML transmitted toward the first UE is configured to be trained at the first UE using local data available at the first UE, the global ML transmitted toward the second UE is configured to be trained at the second UE using local data available at the second UE, the global ML model is associated with the first application or the first application type, and the global ML model is configured to predict future network conditions of a network.

11. The method of claim 10, the method further comprising:

(i) receiving from the first UE first local ML model information identifying a first locally trained ML model, (ii) receiving from the second UE second local ML model information identifying a second locally trained ML model, (iii) combining the first local trained ML model and the second locally trained ML model, thereby generating an updated global ML model, and (iv) transmitting toward the first UE and the second UE updated global ML model information identifying the updated global ML model.

12. The method of claim 11, the method further comprising:

receiving from a plurality of UEs data packets, wherein each of the data packets includes an identifier identifying a different application or a different application type;

unpacking only a part of each of the data packets to obtain the identifier;

transmitting toward a dQCI table a request for data handling information, wherein the request includes the identifier;

receiving from the dQCI table the data handling information; and performing any one or more of the followings:

prioritizing, based on the received data handling information, the data packets, and allocating, based on the received data handling information, downlink (DL) resources or uplink (UL) resources for the data packets.

13. A method performed by a first user equipment (UE), the method comprising:

receiving from a network node a usage data request;

negotiating a first mask value with a second UE;

obtaining first usage value associated with a first application or a first application type;

calculating a first masked usage value using the obtained first usage value and the first mask value as inputs to the calculation;

after receiving the usage data request, transmitting toward the network node a usage data reporting message comprising the first masked usage value, wherein the network node is configured to:

combine the first masked usage value and a second masked usage value, thereby generating a combined usage value; and use the combined usage value to determine a priority level for the first application or the first application type, $V1_{Masked} = V1_{Not\ Masked} + M$ or $V1_{Masked} = V1_{Not\ Masked} - M$, where $V1_{Masked}$ is the first masked usage value, $V1_{Not\ Masked}$ is the first usage value, and M is the first mask value, $V2_{Masked} = V2_{Not\ Masked} - M$ or $V2_{Masked} = V2_{Not\ Masked} + M$, where $V2_{Masked}$ is the second masked usage value, $V2_{Not\ Masked}$ is a second usage value, and M is the mask value, and $V_{Combined}=V1_{Masked}+V2_{Masked}$, where $V_{Combined}$ is the combined usage value.

14. The method of claim 13, wherein negotiating the first mask value with the second UE comprises:

transmitting toward the second UE a request for the first mask value and receiving a response message including the first mask value, or transmitting toward the second UE the first mask value.

15. The method of claim 13, wherein the usage data reporting message includes an application identifier identifying the first application or the first application type, and/or the first usage value indicates the number of times the first application or applications having the first application type was ran at the first UE during a given interval.

16. The method of claim 13, wherein the first UE comprises a central processing unit (CPU), a display screen, a microphone, and/or a camera, and the first usage value indicates any one or a sum of:

a duration of how long the CPU ran the particular application within a given time interval, a duration of how long the display screen was used for the particular application within the given time interval, a duration of how long the microphone was used for the particular application within the given time interval, and a duration of how long the camera was used for the particular application within the given time interval.

17. The method of claim 13, the method further comprising:

receiving from the network node global machine learning (ML) model information identifying a global ML model, wherein the global ML model is associated with the first application or the first application type, and the global ML model is configured to predict future network conditions of a network.

18. The method of claim 17, the method further comprising:

training the global ML model using local data available at the first UE, thereby generating a locally trained ML model; and transmitting toward the network node local ML model information identifying the locally trained ML model.

* * * * *